No. 854,680. PATENTED MAY 21, 1907.
C. E. WIBERG.
STREET FLUSHING APPARATUS.
APPLICATION FILED OCT. 15, 1906.
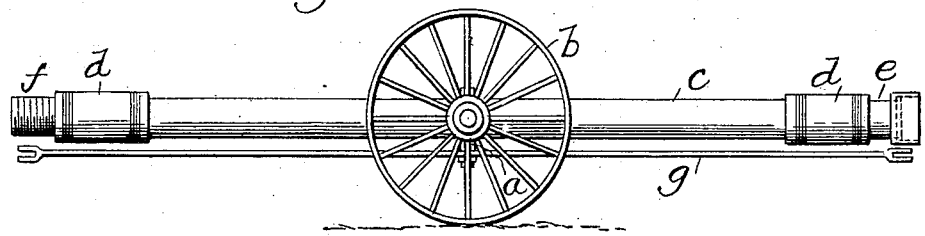
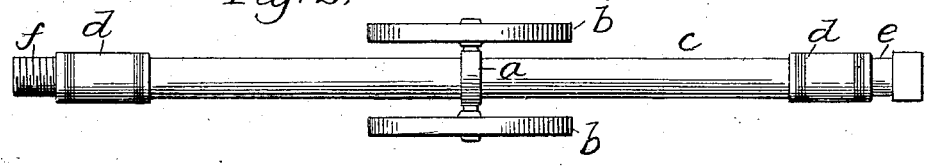
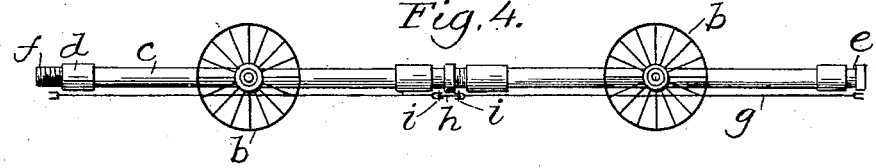
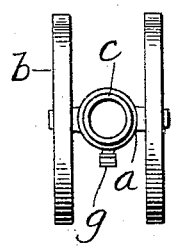
WITNESSES
James P. Duhamel,
M. Hamilton.
INVENTOR
Charles E. Wiberg
BY
James Hamilton
ATTORNEY

UNITED STATES PATENT OFFICE.

CHARLES E. WIBERG, OF ASHLAND, WISCONSIN, ASSIGNOR OF ONE-HALF TO THOMAS BARDON, OF ASHLAND, WISCONSIN.

STREET-FLUSHING APPARATUS.

No. 854,680.

Specification of Letters Patent.

Patented May 21, 1907.

Application filed October 15, 1906. Serial No. 338,952.

*To all whom it may concern:*

Be it known that I, CHARLES E. WIBERG, a citizen of the United States, residing at Ashland, in the county of Ashland and State of Wisconsin, have invented certain new and useful Improvements in Street-Flushing Apparatus, of which the following is a specification, reference being had to the accompanying drawings.

My invention relates to improvements in apparatus for flushing streets; and the object of my invention is to provide an apparatus of this class which will be simple in construction, comparatively cheap in manufacture and easily manipulated.

In carrying out my invention, I use sections of iron pipe which are of suitable length, say, five feet in length. This pipe is cheap and its first cost is not great. Each section of pipe is mounted upon a two-wheel truck which is provided with a draw-bar projecting from the axle toward each end. The ends of the iron pipes are provided with pieces of rubber hose, which serve to form flexible joints; and the outer end of each piece of rubber hose is formed with a coupling member, by which the several sections may be coupled together when desired. Of course, the coupling members attached to the same section are complementary. The draw-bars are coupled together and in this way the rubber parts which form the joints are relieved from all pulling strain.

In the drawing illustrating the principle of my invention and the best mode now known to me of applying that principle, Figure 1 is a side elevation of one section of my new street flushing apparatus; Fig. 2 is a plan view of the same; Fig. 3 is an end view of the same; and Fig. 4 shows two of the sections coupled together.

Upon the axle $a$ are mounted the wheels $b$ and a section of iron pipe $c$ to each end of which is secured a piece of rubber hose $d$ of suitable length to form a joint, (say 8 inches in length.) To the outer end of each piece of rubber hose $d$ is suitably secured a coupling member, the coupling members $e$ and $f$ being complementary. Attached to the axle $a$ is a draw-bar $g$ which may be connected to the draw-bar of another section by means of the coupling link $h$ and coupling pins $i$, as is illustrated in Fig. 4. By means of the draw-bar the rubber hose $d$ which forms the joints is relieved from all pulling strain, while the rubber hose itself gives flexibility to the apparatus in turning street corners.

The first cost of the iron pipe is very small compared with rubber and the pipe itself is much more durable than rubber hose. Moreover, the pipe is easily drained by tipping it on the axle after use.

I claim:

1. An apparatus for flushing streets, comprising a metallic pipe, an axle fixed to the middle of the metallic pipe, and wheels mounted on the said axle and arranged at opposite sides of the metallic pipe to support the same above the ground.

2. An apparatus for flushing streets, comprising a metallic pipe, an axle fixed to the middle of the metallic pipe, wheels mounted on the said axle and arranged at opposite sides of the metallic pipe to support the same above the ground, complementary coupling members, flexible hose sections connecting said coupling members to opposite ends of the metallic pipe, and a draw bar fixedly connected at its middle to the axle and extending longitudinally under the metallic pipe.

In testimony whereof I have hereunto set my hand this 10th day of October, A. D., 1906, at said Ashland in the presence of two witnesses.

CHARLES E. WIBERG.

Witnesses:
L. M. RICK,
BEN. S. SMITH.